United States Patent
Zepp et al.

(10) Patent No.: US 7,042,130 B2
(45) Date of Patent: May 9, 2006

(54) ELECTRICAL MACHINE CONSTRUCTION USING AXIALLY INSERTED TEETH IN A STATOR RING OR ARMATURE

(75) Inventors: Lawrence P. Zepp, Fort Wayne, IN (US); James R. Hendershot, Jr., Venice, FL (US)

(73) Assignee: Dura-Trac Motors, Inc., Fort Wayne, IN (US)

( * ) Notice: Subject to any disclaimer, the term of this patent is extended or adjusted under 35 U.S.C. 154(b) by 0 days.

(21) Appl. No.: 11/033,036

(22) Filed: Jan. 11, 2005

(65) Prior Publication Data

US 2005/0116575 A1  Jun. 2, 2005

Related U.S. Application Data

(62) Division of application No. 10/094,218, filed on Mar. 8, 2002, now Pat. No. 6,880,229.

(51) Int. Cl.
*H02K 1/18* (2006.01)
(52) U.S. Cl. ........................... 310/218; 310/258
(58) Field of Classification Search ........ 310/254–255, 310/42, 43, 89, 191, 216–218, 154–156, 310/257, 194, 51, 258, 259, 269; 29/596, 29/606, 609
See application file for complete search history.

(56) References Cited

U.S. PATENT DOCUMENTS

| 893,711 | A | * | 7/1908 | Cushman | 310/254 |
|---|---|---|---|---|---|
| 2,153,563 | A | | 4/1939 | Hubacker | |
| 2,445,986 | A | | 7/1948 | Adamson | |
| 4,480,208 | A | | 10/1984 | Logie et al. | |
| 4,485,320 | A | | 11/1984 | Kawada et al. | |
| 4,912,353 | A | * | 3/1990 | Kondo et al. | 310/259 |
| 5,390,409 | A | | 2/1995 | Courtney | |
| 5,469,009 | A | | 11/1995 | Wakui et al. | |
| 5,570,503 | A | | 11/1996 | Stokes | |
| 6,028,386 | A | | 2/2000 | Kech et al. | |
| 6,133,669 | A | | 10/2000 | Tupper | |
| 6,145,314 | A | | 11/2000 | Woollenweber et al. | |
| 6,229,240 | B1 | | 5/2001 | Kech et al. | |
| 6,278,206 | B1 | | 8/2001 | Yockey et al. | |
| 6,313,557 | B1 | * | 11/2001 | De Filippis et al. | 310/216 |
| 6,348,753 | B1 | | 2/2002 | Sakai et al. | |
| 6,753,633 | B1 | * | 6/2004 | Eberle | 310/216 |
| 6,844,653 | B1 | * | 1/2005 | Kolomeitsev et al. | 310/218 |

* cited by examiner

*Primary Examiner*—Dang Le
(74) *Attorney, Agent, or Firm*—Butzel Long (57) ABSTRACT

An electrical machine using a plurality of separate teeth that can be axially inserted into a stator ring or armature after receiving a bobbin or form wound coil. Each tooth contains a primary locating structure and a secondary locating structure which respectively set the radial position and the angular position of the teeth in a stator ring. This construction can also be used with internal motor armatures. The primary and secondary locating structures have a size equal to or smaller than the portion of the tooth that holds the coil. This allows insertion of a pre-wound coil over these features without interference. The use of separate stator or armature teeth that are press fitted into the stator ring or armature allows the use of coil types that could not be inserted into a one piece stator or armature and tooth materials with optimum magnetic properties.

14 Claims, 6 Drawing Sheets

ELECTRICAL MACHINE CONSTRUCTION USING AXIALLY INSERTED TEETH IN A STATOR RING OR ARMATURE

RELATED APPLICATIONS

The present application is a divisional application of U.S. patent application Ser. No. 10/094,218, filed Mar. 8, 2002 now U.S Pat. No. 6,880,229.

RELATED APPLICATIONS

The present invention was first disclosed in the Disclosure Document filed in the United States Patent and Trademark Office on Aug. 14, 2000 and assigned Disclosure Document No. 478531. There have been no previously filed applications anywhere in the world.

TECHNICAL FIELD

The present invention relates to electrical machines having stators, armatures and similar structures which include radial projections supporting wire coils. More particularly, the present invention is directed to methods of constructing electrical machines having stators, armatures and similar structures and to such electrical machines.

BACKGROUND ART

The use of stacked steel lamina in the construction in electrical machines having rotor/stator elements has been found useful to reduce magnetic eddy current losses as the magnetic fields rise and fall within such machines. Laminated stators that are typically used in electric motors form the stationary exteriors of such motors and are provided with a plurality of slots and teeth on their inner surfaces upon which structure wire coils are wound and/or otherwise secured. To increase magnetic performance and reduce magnetic clogging, the teeth provided on such stators have widened faces or surface adjacent the rotor. By widening the faces or inner surfaces of the teeth, often only small slots between the teeth provide access to insert or wind the wire coils into the slots and around the teeth. The wire which is inserted into the slots and wound around the teeth form the electromagnetic coils of the motor. In addition to motors, alternators and generators have similar structures/construction. Because of the physical structural restrictions, the resulting coils do not have precise parallel wound turns and tend to have longer wire lengths (causing higher resistance) and lower copper density.

In high current electrical machines that require large cross sectional areas of wire or buss bars, inserting or winding a coil in a one piece stator slot can be difficult or even impossible, due to the small access slot opening and the stiffness of the conductor used.

U.S. Pat. No. 2,153,563 to Hubacker discloses a method of fabricating an electric motor that involves the use of a laminated stator having open slots and straight teeth which allow for easy coil winding. The straight teeth are capped by laminated steel tooth extensions that widen to a typical tooth width and slot size. The laminated tooth extensions taught by Hubacker are held by an inner ring and do not receive the coils. The tooth extensions serve only to transmit magnetic flux to the rotor and have tooth widths that are greater than the size of the coils' inside dimensions.

U.S. Pat. No. 4,912,353 to Kondo et al. discloses a two-piece motor stator construction that uses an inner ring and an outer ring. The inner ring is an annular structure having a plurality of stator teeth that extend radially outward from an outer surface thereof. The tip of each stator tooth includes a male dovetail structure. The male dovetail structure is larger than the portion of the tooth holding the coil. Accordingly, the construction prohibits the use of a bobbin or form wound coil. The wire coils in Kondo et al. are wound onto the teeth projecting from the inner annular ring. Thereafter, the male dovetail portions of teeth are pressed into complementary shaped female dovetail slots provided in the outer stator ring, thus forming a complete stator assembly.

DISCLOSURE OF THE INVENTION

According to various features, characteristics and embodiments of the present invention which will become apparent as the description thereof proceeds, the present invention provides an electric machine which includes:

two coaxial structures which are configured so that one of the two coaxial structures rotates relative to another of the two coaxial structures about a common central axis;

a plurality of slots provided in a peripheral surface of one of said two coaxial structures, said slots having central axes which are parallel to the common central axis;

a plurality of tooth structures having first ends thereof which are configured to be received in the plurality of slots; and a plurality of coils which are configured to be received over the first ends of the plurality of tooth structures.

The present invention further provides a method of making an electric machine which involves:

providing two coaxial structures which are configured so that one of the two coaxial structures rotates relative to another of the two coaxial structures about a common central axis;

providing a plurality of slots in a peripheral surface of one of said two coaxial structures, said slots having central axes which are parallel to the common central axis;

providing a plurality of tooth structures having first ends thereof which are configured to be received in the plurality of slots;

providing a plurality of coils which are configured to be received over the first ends of the plurality of tooth structures;

placing the plurality of coils over the first ends of the plurality of tooth structures and onto central portions thereof; and inserting the plurality of tooth structures with the coils thereon into the plurality of slots.

BRIEF DESCRIPTION OF DRAWINGS

The present invention will be described with reference to the attached drawings which are given as non-limiting examples only, in which.

BEST MODE FOR CARRYING OUT THE INVENTION

The present invention is directed to electrical machines that include stators or armatures which are configured to have a plurality of radially projecting teeth and coil windings supported on the teeth. Such electrical machines are exemplified by electrical motors, generators, alternators and other machines that produce or utilize rotational motion of a drive element. The present invention provides a construction design of a stator or armature that includes a stator ring or armature with separate teeth that can be inserted into slots in the stator ring or armature. The slots and teeth are configured so that the teeth can be axially inserted into the slots of the stator ring or armature and secured in fixed radially alignment. In the construction of stators the teeth are arranged to project radially inward. In the construction of armatures, the teeth are arranged to project radially outward.

The axially insertable teeth of the present invention can accept pre-wound coils without interference before the resulting assemblies are inserted and/or press fit into a stator or armature. The teeth include both primary and secondary locating structures for maintaining alignment in the stator or armature. The primary and secondary locating structures are dimensioned so that pre-wound coils can be received over these structures and onto central portions of the teeth without interference. The use of separate stator or armature teeth that are inserted and/or press fit into a stator ring or armature allows for the use of coil configurations that could not be used in conjunction with one piece stators or armatures. In addition, the construction of the present invention allows for the use of tooth materials that have optimum magnetic properties.

Motor stators or armatures are constructed according to the present invention using separate teeth that receive wound coils hereon before being axially inserted into slots provided in the stator ring or armature. As noted above, each tooth includes both a primary locating structure and a secondary locating structure that are used to align the teeth with, and couple them to, the stator or armature. The primary locating structure includes a male partial cylindrical shaped portion which sets or fixes the radial position of the tooth and is received in a complementary shaped female partial cylindrical portion of a slot provided in the stator ring or armature. The primary locating structure also withstands the magnetic attraction and repulsion forces exerted on the teeth and coils. The secondary locating structure includes male planar surfaces that are parallel to the centerline of the teeth. These male planar surfaces set or fix the angular position of the teeth in the stator and cooperate with female planar surfaces of the slots in the stator ring or armature. The secondary locating structures also resist angular deflection or rocking caused by magnetic attraction and repulsion forces exerted on the teeth and coils. This construction can also be used with internal motor armatures.

As indicated above, the primary and secondary locating structures are dimensioned so that pre-wound coils can be received over these structures and onto central portions of the teeth without interference. According to one embodiment, the primary and secondary locating structures have a size that is equal to or smaller than the portion of the teeth that hold the coils. The present invention can be used in conjunction with a variety of coil configurations, including level wound coils. A level wound wire coil for use in one embodiment of the present invention can be made by forming windings on a insulating bobbin. Such a construction offers greater efficiency and lower cost compared to forming windings on a one piece stator. Alternately, the present invention can make use of a wire or buss bar coil formed in a shape that will fit onto the stator teeth. The teeth are inserted through the bobbin coils or form wound coils and the resulting assemblies are installed into the stator ring or armature. This method allows for the use of a thicker copper buss bar than could be wound onto a conventional one piece stator tooth/slot configuration because of the lower winding resistance of the present invention. It is of course possible to wind the coils directly on the teeth prior to, or even after, inserting the teeth into slots of the stator ring or armature.

The use of separate stator or armature teeth that are inserted and/or press fitted into the stator ring or armature according to the present invention also allows for the use of materials that can optimize magnetic properties. For example, the teeth can be made from an insulated particle pressed iron material that will allow for superior size control and manufacturing costs savings. Alternately, the teeth can be made from a material that has a magnetic flux orientation, such as electrical steel. The teeth can be cut, machined, stamped or otherwise formed from oriented magnetic materials so that the magnetic flux is oriented along the central axis of the teeth so as to provide for increased magnetic performance. When applicable materials, including oriented and/or non-oriented magnetic materials are used, the teeth can be made of multiple thin laminations that are adhesive bonded together using an epoxy or other adhesive, or otherwise welded together or mechanically interlocked. Using magnet oriented materials in this type of laminated construction is not applicable to one piece stator designs, because although it would increase magnetic performance in the oriented direction, it would reduce magnetic performance 90 degrees to the oriented direction.

The stator ring used according to the present invention can be made using a stack of thin steel laminations that contain slots having the female shape of the primary and secondary locating structures. The stacked laminations of the stator can be welded on the outer diameter of the laminations or bonded or mechanically interlocked to form a solid ring. The use of stamped steel laminations to form the stator ring or armature provides a resilient material into which the stator or armature teeth and be inserted and/or pressed into. This resiliency provides a significant advantage in the case of inserting and/or pressing teeth made from powdered iron material, which tends to be brittle. In an alternative embodiment, the stator ring can be made as a one-piece structure (excluding the teeth) by a powdered metallurgical process that involves heating, compacting and optionally curing iron grains that are insulated with a thin layer of a non-metallic binder. Structures formed by such materials/methods demonstrate reduced magnet eddy current losses as compared to laminated steel structures. In addition, powered metallurgical processing methods that use insulated iron grains provide significantly lower production costs than most stacked lamination processes. The stator can also be made using other processes such as casting, extrusion, machining, multiple laminations, etc. Similar construction methods can be used to fabricate AC motor stators, DC brush motor stators, AC/DC wound motor armatures, alternators, generators, linear motors, transformers and other electric machines.

All of the above factors add to the efficiency and economic manufacturing an electrical machine according to the present invention.

The invention will be described herebelow with reference to the drawings which are given as non-limiting examples of various embodiments of the present invention. For convenience, reference is made to the elements of a stator, e.g. stator ring, stator tooth/teeth, etc., in the drawings for illustrative purposes. However, it is to be understood that the invention is not limited to a stator assembly as noted elsewhere. Throughout the drawings, common reference numerals are used to identify common element whenever possible.

Figure 1:
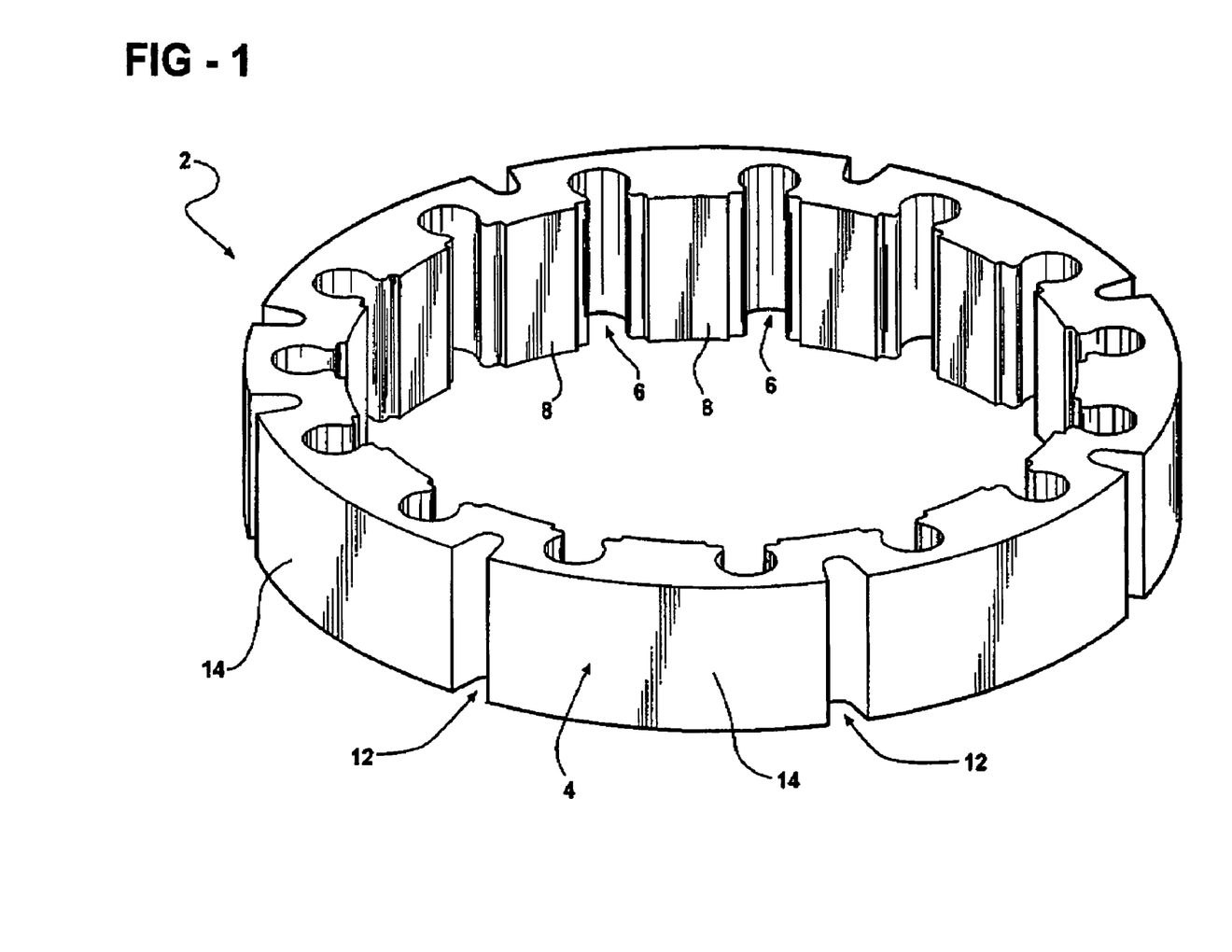
FIG. 1 is a perspective view of a stator ring according to one embodiment of the present invention.

FIG. 1 is a perspective view of a stator ring according to one embodiment of the present invention. The stator ring 2 shown in FIG. 1 is formed from a plurality of thin metal laminations 4 that are sacked up and adhesive bonded together using an epoxy or other adhesive, or otherwise welded together or mechanically interlocked. The stator ring 2 comprises an annular structure having a plurality of slots 6 formed in and inner peripheral surface 8 thereof which are axially aligned and generally equally spaced about the inner peripheral surface 8 as shown. The slots 6 are configured to have a particular cross sectional shape to receive stator teeth 10 as discussed in more detail below. The stator ring 2 shown in FIG. 1 includes a plurality of notches 12 that are formed in the outer peripheral surface 14. These notches 12 are configured to receive tie rods (not shown) therein by which the stator ring 2 is axially coupled to a motor housing (not shown).

In an alternative embodiment, the stator ring 2 can comprise a solid one-piece structure made by powder metallurgical methods as discussed above or by other processes such as casting, extrusion, machining, etc.

Figures 2, 4:
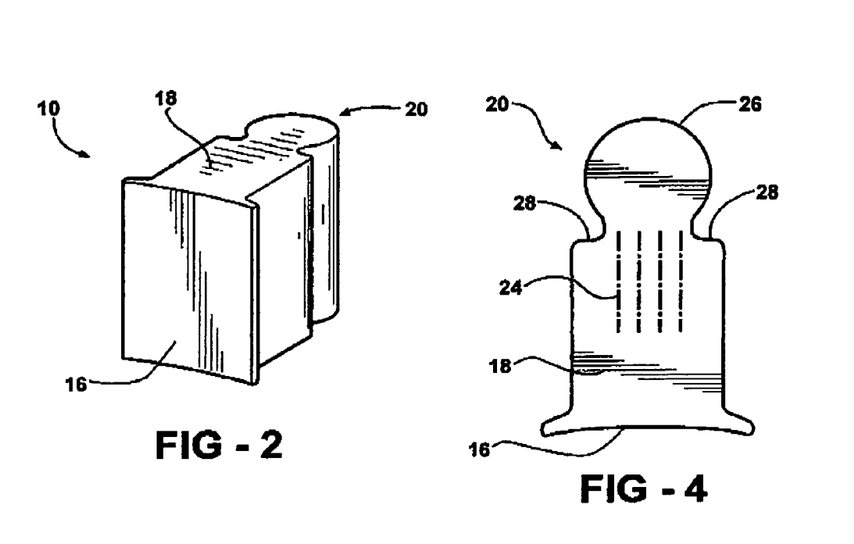
FIG. 2 is a perspective view of a stator tooth according to one embodiment of the present invention.
FIG. 4 is a cross sectional view of a stator tooth which depicts the alignment of magnet flux properties according to the present invention.

FIG. 2 is a perspective view of a stator tooth according to one embodiment of the present invention. The stator ring 2 depicted in FIG. 1 is configured to receive a plurality of stator teeth 10 in the slots 6 thereof. FIG. 2 depicts a single one of such stator teeth. The stator tooth 10 in FIG. 2 includes a widened face 16 that has a concave radial surface which is configured to closely oppose the outer cylindrical surface of a rotor when the stator of the present invention is used in the construction of a motor. The central portion 18 of the stator tooth 10 has a substantially rectangular shape. The side of the stator tooth 10 which is opposed to the widened face 16 comprises a positioning structure 20 which is configured to be received in the slots 6 of the stator ring 2.

As discussed above, the stator tooth (teeth) 10 can be made from an insulated particle pressed iron material or can be cut, machined or stamped from materials having oriented magnetic flux properties so that the magnetic flux properties are oriented along the central axis of the stator teeth to provide for increased magnetic performance. When thin materials are used, whether or not they have oriented magnetic flux properties, the stator teeth can be made of multiple thin laminations that are adhesive bonded together using an epoxy or other adhesive, or otherwise welded together or mechanically interlocked.

Figure 3:
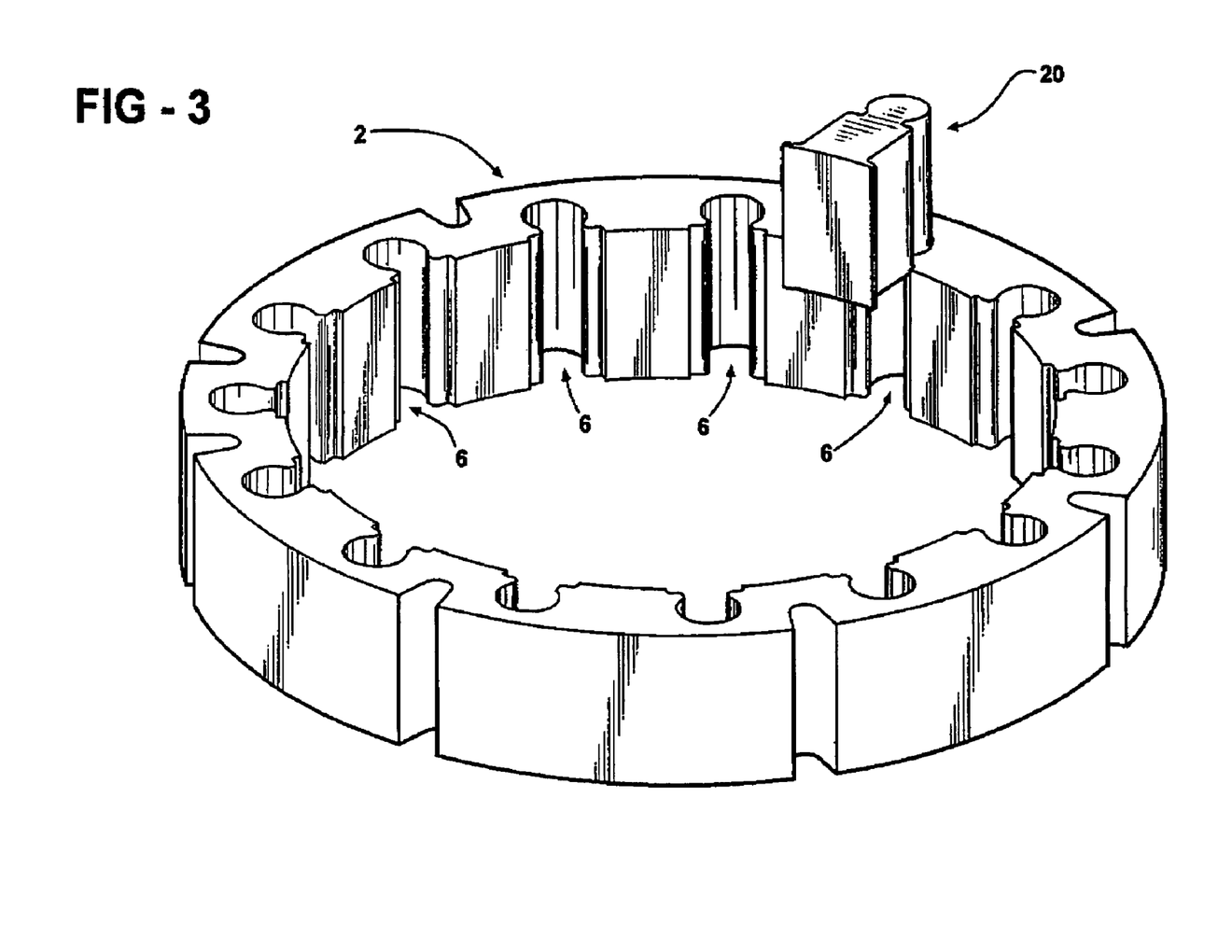
FIG. 3 is a perspective view of the stator ring of FIG. 1 showing how the stator tooth of FIG. 2 is inserted in the stator ring.

FIG. 3 is a perspective view of the stator ring of FIG. 1 showing how the stator tooth of FIG. 2 is inserted in the stator ring. As depicted in FIG. 3, the positioning structure 20 formed on the side of the stator tooth (teeth) 10 which is opposed to the widened face 16 is aligned with the complementary shaped slot(s) 6 formed on the inner surface 8 of the stator ring 2. According to one embodiment of the present invention, the stator teeth 10 are pressed fit into the slots 6. Alternatively, the stator teeth 10 could be secured in the slots 6 by mechanical means such as clips, set screws, etc. As will be discussed below, after the coils 22 are positioned on the stator teeth 10 and the stator teeth are inserted in the slots 6, the assembly is potted in an epoxy or other curable resinous material. Therefore, it is possible to use means such as clips or plugs in the ends of the slots 6 to secure the stator teeth 10 so that the subsequent step of potting the assembly can be performed and used to more securely hold the stator teeth 10 in position.

FIG. 4 is a cross sectional view of a stator tooth which depicts the alignment of magnet flux properties according to one embodiment of the present invention. In FIG. 4 the stator tooth 10 is formed from laminations of a material such as silicon electric steel that has magnetic flux properties. The stator tooth 10 in FIG. 1 has magnetic flux properties which as indicated by broken lines 24 are oriented in alignment with the central axis of the stator tooth 10. This orientation of magnetic flux properties is similar for each individual lamination which is made, e.g., stamped from a stock sheet of the magnetic flux oriented material. Generally each of the individual laminations which are stacked to form a stator tooth 10 has a similar magnetic flux orientation. However, non-oriented materials could also be used. Orienting the magnetic flux along the central axis of the stator teeth 10 provides for increased magnetic performance.

Figure 5:
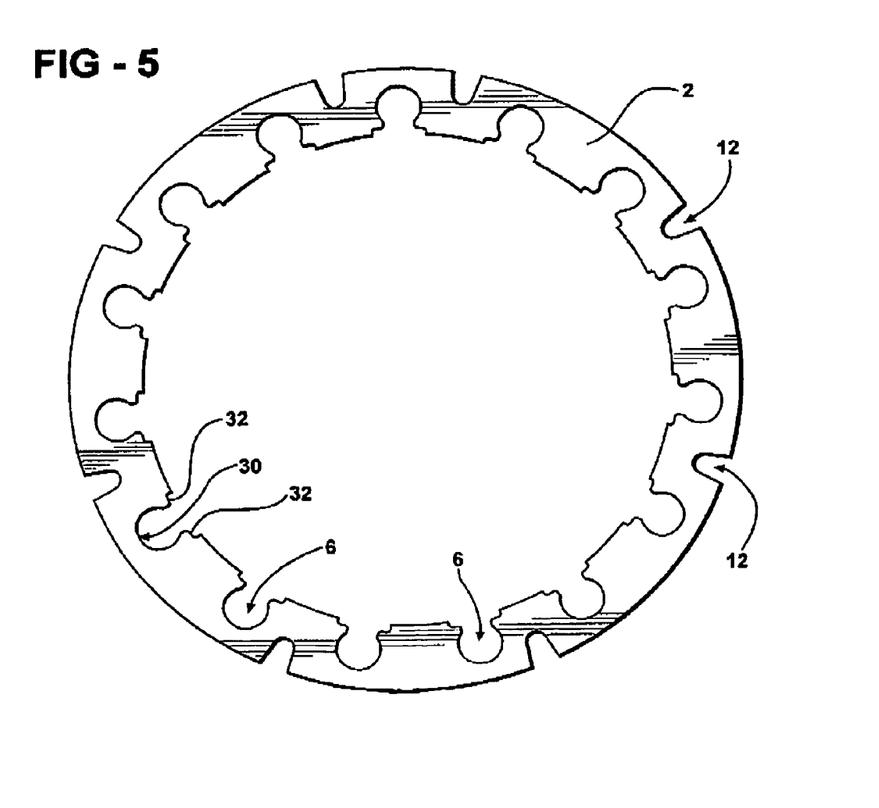
FIG. 5 is a cross sectional view of the stator ring of FIG. 1.
Figure 6:
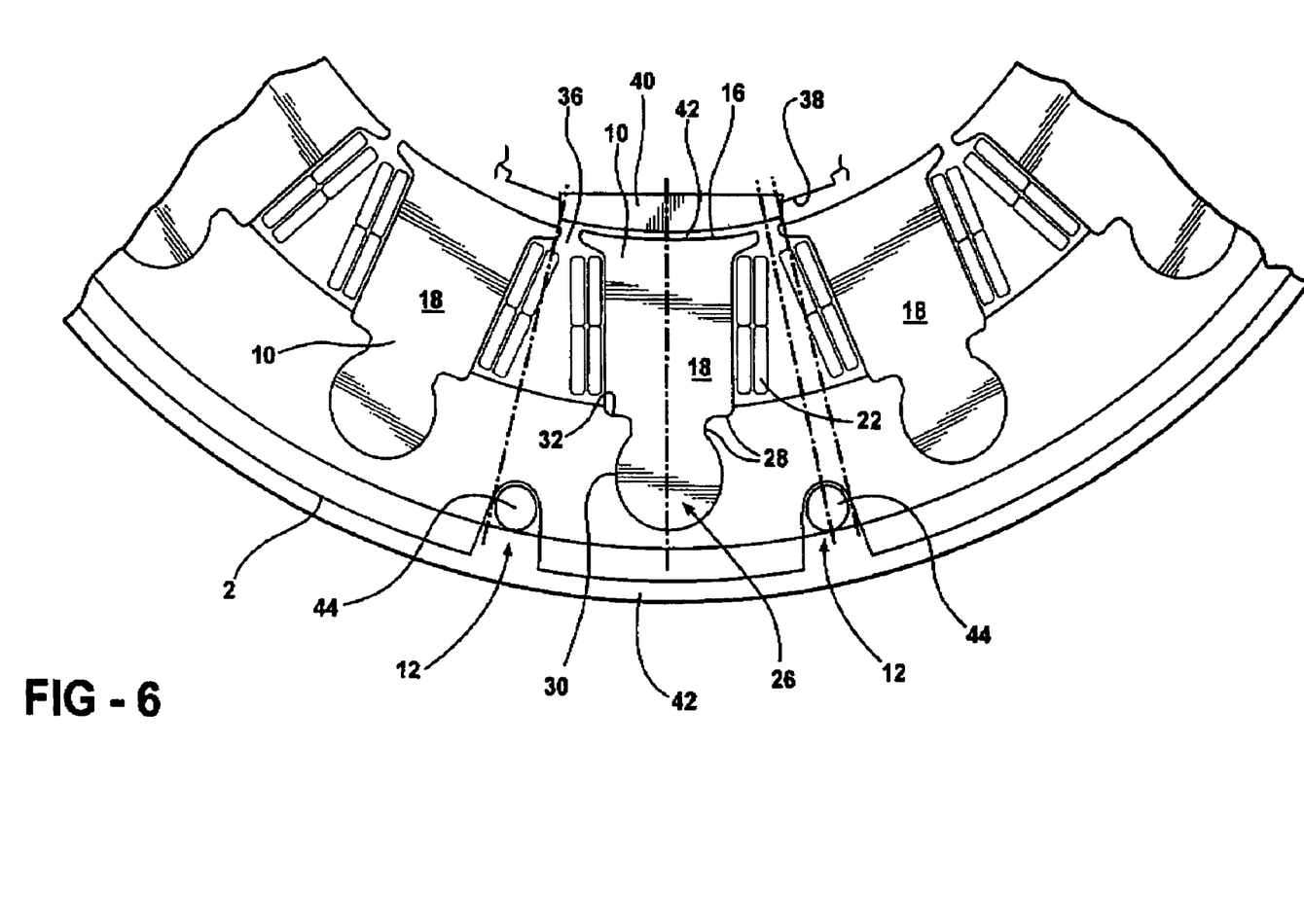
FIG. 6 is a partial cross sectional view of an electric machine having the construction according to one embodiment of the present invention.

The radius of curvature of the widen face 16 of stator tooth 10 can be seen in FIG. 4 together with the positioning structure 20 on the opposite side of the stator tooth 10. The central portion 18 of the stator tooth 10 is shown as having a rectangular shape. The position structure 20 comprises a compound positioning structure which includes the a primary locating structure 26 and a secondary locating structure 28 discussed above. The primary locating structure 26 includes a male partial cylindrical shaped portion which sets or fixes the radial position of the stator teeth 10 in the stator ring 2 and is received in a complementary shaped female partial cylindrical portion 30 of the slots 6 (FIG. 5). The primary locating structure 26 withstands the magnetic attraction and repulsion forces exerted on the stator teeth 10 and coils 22 (FIG. 6). The secondary locating structure 28 includes male planar surfaces that are parallel to the centerline of the stator teeth 10. These male planar surfaces set or fix the angular position of the stator teeth 10 in the stator ring 2 and cooperate with female planar surfaces 32 of the slots 6 in the stator ring 2 (FIG. 5). The secondary locating structure 28 resist angular deflection or rocking caused by magnetic attraction and repulsion forces exerted on the stator teeth 10 and coils 22.

FIG. 5 is a cross sectional view of the stator ring of FIG. 1. FIG. 5 depicts the cross sectional shape of the slots 6 which include the female partial cylindrical portions 30 and the female planar surfaces 32 which are complementary shaped with respect to the corresponding male partial cylindrical portions of the primary locating structure 26 and the male planar surfaces of the secondary locating structure 28.

FIG. 6 is a partial cross sectional view of an electric machine having a construction according to one embodiment of the present invention. FIG. 6 depicts the stator teeth 10 positioned in the slots 6 of the stator ring 2. From FIG. 6 it can be understood that the male partial cylindrical portions of the primary locating structure 26 and female partial cylindrical portions 30 of the slots 6 have axes which are coaxially aligned so as to set or fix the radial position of the stator teeth 10 in the stator ring 2. It can also be understood from FIG. 6 how the male planar surfaces of the secondary locating structure 28 abut the female planar surfaces 32 of the slots 6 and thereby set of fix the angular position of the stator teeth 10 in the stator ring 2.

In FIG. 6, the widened faces 16 of the stator teeth 10 are dimensioned so that there is a relatively small gap 36 between each adjacent stator tooth 10. These gaps 36 can have widths which are smaller than the diameter of wire or buss bar used in the stator coils 22. It thus can be understood how difficult it would be to wind the coils 22 if the stator teeth 10 were fixed to the stator ring 2 before the coils 22 were wound. FIG. 6 also depicts a rotor 38 having permanent magnets 40 fixed to the outer periphery thereof, and shows the small gap 42 between the widened faces 16 of the stator teeth 10 and the rotor 38.

The coils 22 depicted in FIG. 6 are coupled to the stator teeth 10 before the stator teeth 10 are inserted into and coupled to the stator ring 2. The coils 22 can be wound directly on the central portion 18 of the stator teeth 10. Alternatively, the coils 22 can be pre-would on bobbins and the coil and bobbin assemblies could be located on the central portion 18 of the stator teeth 10 by inserting the stator teeth 10 therethrough, positioning structure 20 first. In a further alternative embodiment, the coils 22 could be pre-wound or shaped on a mandrel and the formed coils 22 could be located on the central portion 18 of the stator teeth 10.

FIG. 6 shows a portion of the housing 42 of a motor and the tie rods 44 that pass through notches 12 and secure the stator between two housing portions.

Figure 7:
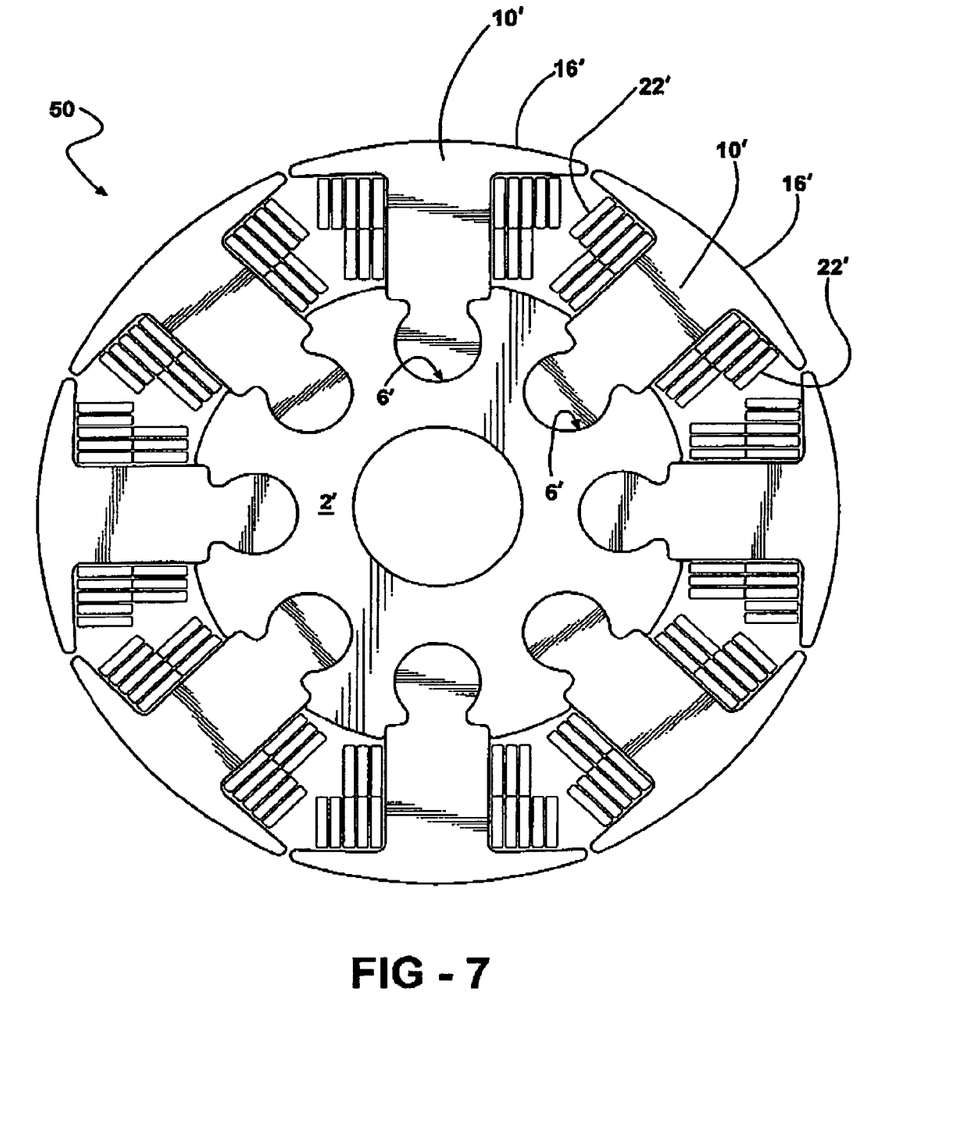
FIG. 7 is a cross sectional view of an armature according to one embodiment of the present invention.

FIG. 7 is a cross sectional view of an armature according to one embodiment of the present invention. The armature 50 depicted in FIG. 7 is some what similar to the stator discussed in reference to FIGS. 1–6. The main differences are that slots 6' in the armature ring 2' are in an outer surface thereof and the widen faces 16' of the armature teeth 10' have a convex radius of curvature. Otherwise, the elements of the armature 50 shown in FIG. 7 can be made from the same materials and in the same way as the corresponding elements in the stator shown in FIG. 1–6 and discussed above.

Figure 8:
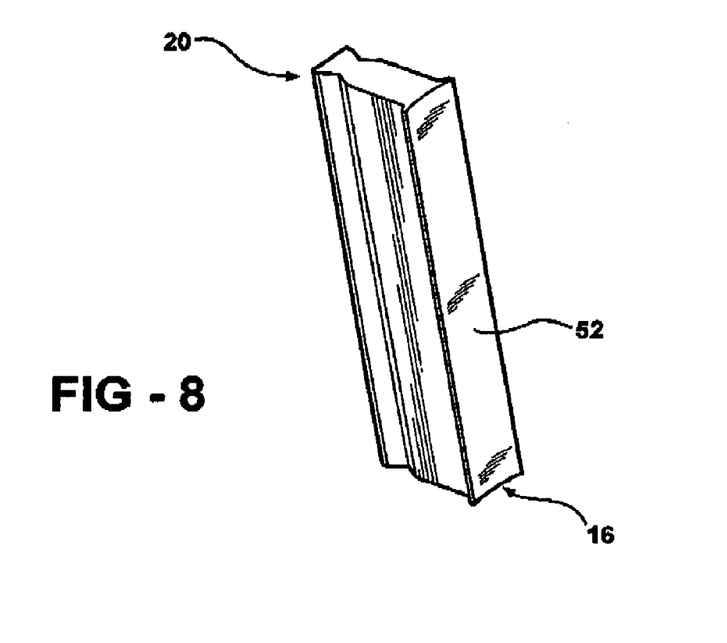
FIG. 8 is a perspective view of a stator tooth according to another embodiment of the present invention.

FIG. 8 is a perspective view of a stator tooth according to another embodiment of the present invention. FIG. 8 depicts an embodiment in which the stator tooth 10 is made of multiple thin laminations 52 that are adhesive bonded together using an epoxy or other adhesive, or otherwise welded together or mechanically interlocked As discussed above, the laminations 52 which form the stator tooth 10 can be formed from magnetic flux oriented materials or non-oriented materials The stator tooth 10 in FIG. 8 has widened face 16 and a positioning structure 20 which is configured to be received in the slots 6 of a stator ring 2. In this embodiment, the positioning structure 20 has a dovetailed configuration. It is to be understood that the positioning structure 20 of the stator teeth 10 of the present invention can have configurations other than those depicted in the drawings, as long as they are configured to engage and/or interlock with complementarily shaped slots 6 in a stator ring 2.

Figure 9:
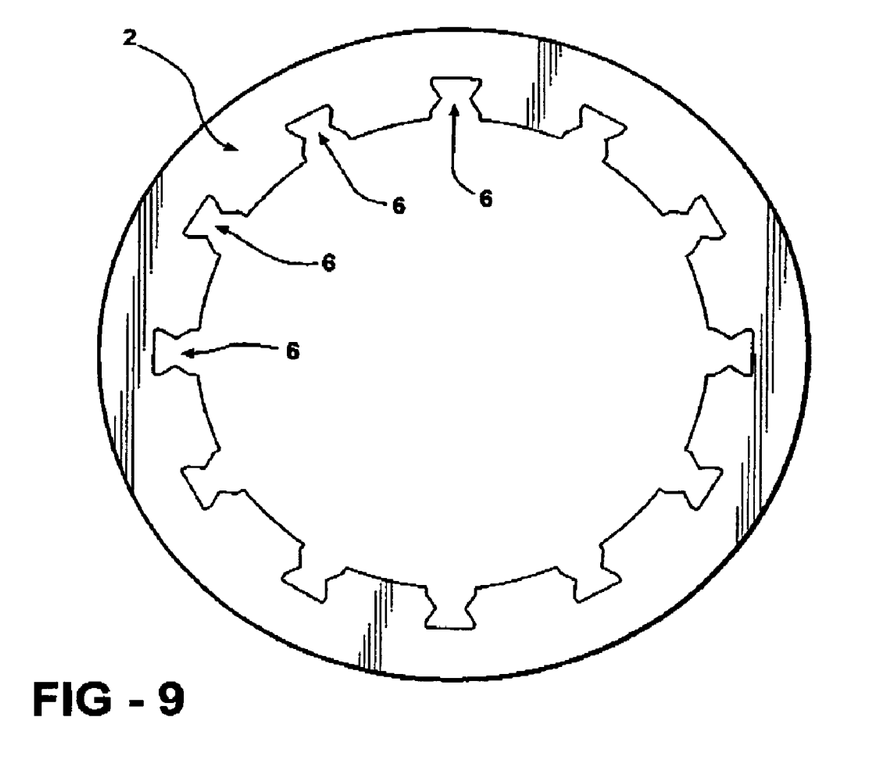
FIG. 9 is a cross sectional view of a stator ring configured to receive stator teeth as shown in FIG. 8.

FIG. 9 is a cross sectional view of a stator ring configured to receive stator teeth as shown in FIG. 8. FIG. 9 depicts a stator ring 2 which includes slots 6 that are complementarily shaped to the dovetailed positioning structure 20 of the stator tooth 10 in FIG. 8.

While the invention has been described above with reference to elements of a stator, e.g. stator ring, stator tooth/teeth, etc., in the drawings for illustrative purposes, it is noted that similar construction methods as those described above can be used to fabricate AC motor stators, DC brush motor stators, AC/DC wound motor armatures, alternators, generators, linear motors, transformers and other electric machines.

Although the present invention has been described with reference to particular means, materials and embodiments, from the fore-going description, one skilled in the art can easily ascertain the essential characteristics of the present invention and various changes and modifications can be made to adapt the various uses and characteristics without departing from the spirit and scope of the present invention as described above.

What is claimed is:

1. An electric machine which comprises: two coaxial structures which are configured so that one of the two coaxial structures rotates relative to another of the two coaxial structures about a common central axis; a plurality of slots provided in a peripheral surface of one of said two coaxial structures, said slots having central axes which are parallel to the common central axis; a plurality of tooth structures having first ends thereof which are configured to be received in the plurality of slots, second opposite ends and a central portion extending between the first and second opposite ends, said first ends each having a partial cylindrically shaped locating surface positioned and extending greater than 180° continuously to and between a pair of shoulder structures which shoulder structures resist angular deflection of the tooth structures when said first ends of said tooth structures are inserted in the plurality of slots, said partial cylindrically shaped locating surface having a constant uniform radius along an entire periphery thereof and a single radial center; and a plurality of coils which are configured to be received over the first ends of the plurality of tooth structures.

2. An electric machine according to claim 1, wherein the first ends of the plurality of tooth structures and the plurality of slots include both partial cylindrical shaped and planar shaped structures.

3. An electric machine according to claim 2, wherein the partial cylindrical shaped structures set the radial position of the plurality of tooth structures relative to the one of the two coaxial structures having the plurality of slots therein.

4. An electric machine according to claim 3, wherein the plurality of tooth structures have second ends which are wider than both the first ends and central portions of the tooth structures.

5. An electric machine according to claim 2, wherein said at least one of said two coaxial structures having the plurality of slots therein is formed by a powered metallurgical process.

6. An electric machine according to claim 1, wherein the planar shaped structures set the angular position of the plurality of tooth structures relative to the one of the two coaxial structures having the plurality of slots therein.

7. An electric machine according to claim 1, wherein said at least one of said two coaxial structures having the plurality of slots therein comprises a plurality of stacked metal laminations.

8. An electric machine according to claim 1, wherein each of the plurality of tooth structures comprises a plurality of stacked metal laminations.

9. An electric machine according to claim 8, wherein the plurality of stacked metal laminations have a magnetic flux property which is oriented to be aligned in a direction that extends through the first ends of the plurality of tooth structures and opposite second ends of the plurality of tooth structures.

10. An electric machine according to claim 1, wherein the plurality of coils are pre-wound before being received over the first ends of the plurality of tooth structures.

11. An electric machine according to claim 10, wherein the plurality of coils are pre-wound on bobbins before being received over the first ends of the plurality of tooth structures.

12. An electric machine according to claim 1, wherein the plurality of coils are wound on the plurality of tooth structures before the plurality of tooth structures before the plurality of tooth structures are received in the plurality of slots.

13. An electric machine according to claim 1, wherein one of the two coaxial structures comprises a stator.

14. An electric machine according to claim 1, wherein one of the two coaxial structures comprises an armature.

* * * * *